US012255744B2

(12) United States Patent
Wang et al.

(10) Patent No.: US 12,255,744 B2
(45) Date of Patent: Mar. 18, 2025

(54) USER EQUIPMENT-COORDINATION SET HYBRID AUTOMATIC REPEAT REQUEST

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 378 days.

(21) Appl. No.: 17/759,150

(22) PCT Filed: Jan. 19, 2021

(86) PCT No.: PCT/US2021/013872
§ 371 (c)(1),
(2) Date: Jul. 20, 2022

(87) PCT Pub. No.: WO2021/154526
PCT Pub. Date: Aug. 5, 2021

(65) Prior Publication Data

US 2023/0042623 A1 Feb. 9, 2023

Related U.S. Application Data

(60) Provisional application No. 62/967,701, filed on Jan. 30, 2020.

(51) Int. Cl.
*H04L 1/18* (2023.01)
*H04L 1/1829* (2023.01)
*H04W 72/23* (2023.01)

(52) U.S. Cl.
CPC .......... *H04L 1/1854* (2013.01); *H04W 72/23* (2023.01)

(58) Field of Classification Search
CPC ... H04L 1/1854; H04L 1/1864; H04L 1/1896; H04L 2001/0093; H04L 2001/0097; H04L 1/1887; H04W 72/23; H04B 7/026
See application file for complete search history.

(56) References Cited

U.S. PATENT DOCUMENTS

2012/0127935 A1 5/2012 Josiam et al.
2013/0039297 A1 2/2013 Wang
(Continued)

FOREIGN PATENT DOCUMENTS

CN 107872301 4/2018
CN 110169094 8/2019
(Continued)

OTHER PUBLICATIONS

"Foreign Office Action", EP Application No. 21704150.8, Mar. 27, 2024, 5 pages.
(Continued)

*Primary Examiner* — John D Blanton
(74) *Attorney, Agent, or Firm* — Colby Nipper PLLC

(57) ABSTRACT

Techniques and apparatuses are described for user equipment-coordination set, UECS, hybrid automatic repeat request, HARQ, that establish a HARQ timeline that is specific to the capabilities of a respective UECS. Compared to a single user equipment, UE, the HARQ timeline for a UECS depends on a number of factors, such as the joint processing capability in the UECS, latency of communication over a local wireless network between the UEs in the UECS, or the like. Based on its capabilities, the UECS can request uplink and/or downlink processing delay times or a UECS-specific HARQ timeline from a base station. The base station grants the uplink and/or downlink processing delay times or the UECS-specific HARQ timeline to the UECS in a layer-1, layer-2, or a layer-3 control message. The use of a UECS-specific HARQ timeline increases the reliability of HARQ signaling for uplink and downlink communication between the UECS and a base station.

18 Claims, 8 Drawing Sheets

500
User Equipment 112
User Equipment 113
Coordinating UE 111
Base Station 121
Configure UECS 505
510 UE Capability Report
515 UE Capability Report
Determine UECS Capabilities 520
Generate UECS Capability Report 525
530 UECS Capability Report Samples and Schedule
535 UECS Capability Report Samples and Schedule
540 Joint Transmission of UECS Capability Report to Base station
Determine UECS HARQ Configuration 545
550 HARQ Configuration
Downlink and/or Uplink Communication 555

(56) References Cited

U.S. PATENT DOCUMENTS

| | | | | |
|---|---|---|---|---|
| 2013/0223353 | A1 | 8/2013 | Liu et al. | |
| 2014/0098731 | A1* | 4/2014 | Maaref | H04W 76/40 370/312 |
| 2016/0173239 | A1 | 6/2016 | Kim et al. | |
| 2017/0303294 | A1 | 10/2017 | Liu et al. | |
| 2018/0062708 | A1 | 3/2018 | Sun et al. | |
| 2018/0198465 | A1 | 7/2018 | Ericson et al. | |
| 2019/0208539 | A1* | 7/2019 | Christoffersson | H04L 1/0045 |
| 2019/0261443 | A1 | 8/2019 | Baligh et al. | |
| 2019/0268105 | A1 | 8/2019 | Chen et al. | |
| 2019/0312616 | A1 | 10/2019 | Christoffersson et al. | |
| 2019/0312684 | A1 | 10/2019 | Christoffersson et al. | |
| 2020/0015229 | A1 | 1/2020 | Yang et al. | |
| 2020/0374970 | A1 | 11/2020 | Wang et al. | |
| 2021/0211169 | A1* | 7/2021 | Xue | H04W 16/28 |

FOREIGN PATENT DOCUMENTS

| | | |
|---|---|---|
| CN | 110301110 | 10/2019 |
| EP | 3476069 | 5/2019 |
| EP | 3522421 | 8/2019 |
| WO | 2018202798 | 11/2018 |
| WO | 2021154526 | 8/2021 |

OTHER PUBLICATIONS

"Foreign Office Action", CN Application No. 202180009941.X, Apr. 29, 2024, 10 pages.

"Foreign Office Action", IN Application No. 202247045528, Nov. 14, 2022, 7 pages.

"Foreign Office Action", CN Application No. 202180009941.X, Oct. 12, 2023, 18 pages.

"HARQ timing and number of HARQ processes for NR", 3GPP TSG-RAN WG1#88—R1-1703330, Feb. 2017, 3 pages.

"Processing time and number of HARQ processes", 3GPP TSG RAN WG1 Meeting #88—R1-1702991, Feb. 2017, 4 pages.

"International Preliminary Report on Patentability", Application No. PCT/US2021/013872, Apr. 20, 2022, 14 pages.

"International Search Report and Written Opinion", Application No. PCT/US2021/013872, Apr. 15, 2021, 13 pages.

"Written Opinion", Application No. PCT/US2021/013872, Oct. 6, 2021, 7 pages.

* cited by examiner

USER EQUIPMENT-COORDINATION SET HYBRID AUTOMATIC REPEAT REQUEST

RELATED APPLICATION(S)

This application is a national stage entry of International Application No. PCT/US2021/013872, filed Jan. 19, 2021, which claims the benefit of U.S. Provisional Application No. 62/967,701, filed Jan. 30, 2020, the disclosures which are incorporated herein by reference in their entirety.

BACKGROUND

Generally, a base station of a wireless network manages a wireless connection with a user equipment (UE) that is connected to the wireless network. The base station determines configurations for the wireless connection, such as bandwidth, timing, and protocol for the wireless connection.

The quality of service between the UE and the base station can be degraded by a number of factors, such as loss in signal strength, bandwidth limitations, interfering signals, and so forth. This is particularly true for UEs operating at a cell edge, which is frequently troubled by weak signal quality. Combining multiple UEs into a user equipment-coordination set (UECS) that employs joint-reception and joint-transmission can improve the quality of service for a UE in the UECS. However, existing hybrid automatic repeat request (HARQ) techniques do not consider the capabilities of a UECS when a base station configures HARQ processes and schedules HARQ resources.

SUMMARY

This summary is provided to introduce simplified concepts of user equipment-coordination set hybrid automatic repeat request. The simplified concepts are further described below in the Detailed Description. This summary is not intended to identify essential features of the claimed subject matter nor is it intended for use in determining the scope of the claimed subject matter.

In aspects, methods, devices, systems, and means for reporting hybrid automatic repeat request (HARQ) capabilities by a user equipment-coordination set (UECS) in a wireless communications network are described. A user equipment (UE) configured as a coordinating user equipment for a UECS receives, from each of multiple user equipments in the UECS, a respective UE capability report message. The coordinating user equipment consolidates the received UE capability report messages and capabilities of the coordinating user equipment to generate a UECS capability report message. The coordinating user equipment transmits the UECS capability report message to a base station, directing the base station to determine a HARQ configuration for the UECS based on the UECS capability report message.

In further aspects, methods, devices, systems, and means for configuring hybrid automatic repeat request (HARQ) capabilities, by a base station, for a user equipment-coordination set (UECS) in a wireless communications network, are described in which the base station receives a UECS capability report message. Based on the received UECS capability report message, the base station determines a HARQ configuration for the UECS and transmits a HARQ configuration message to the UECS that directs a coordinating user equipment (UE) of the UECS to configure the UECS for communication with the base station.

BRIEF DESCRIPTION OF THE DRAWINGS

The details of one or more aspects of user equipment-coordination set hybrid automatic repeat request are described below. The use of the same reference numbers in different instances in the description and the figures indicate similar elements.

DETAILED DESCRIPTION

Figure 1:
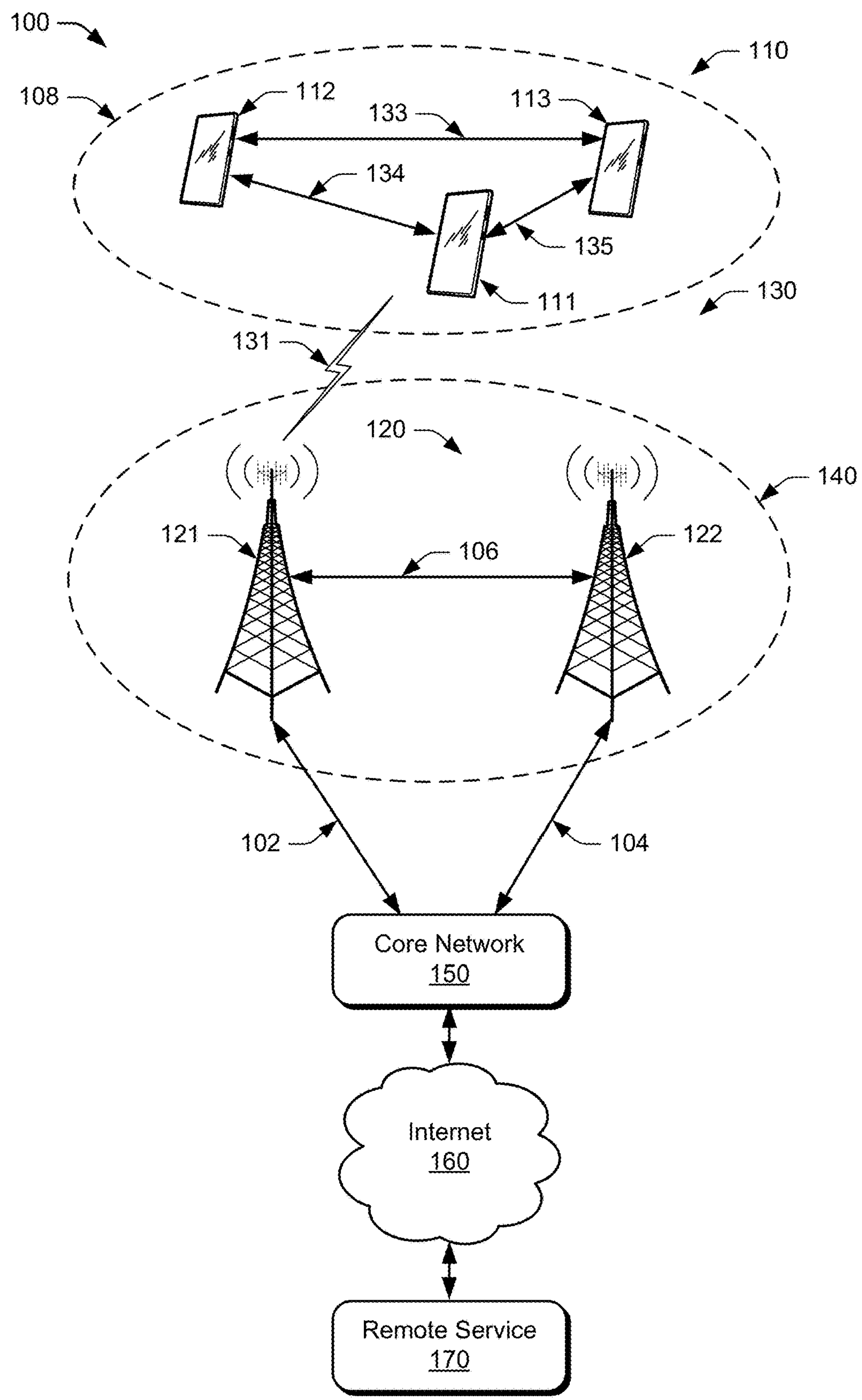
FIG. 1 illustrates an example operating environment in which aspects of user equipment-coordination set hybrid automatic repeat request can be implemented.

This document describes techniques and apparatuses for user equipment-coordination set (UECS) hybrid automatic repeat request (HARQ) that establishes a HARQ timeline that is specific to the capabilities of a respective UECS. Compared to a single user equipment (UE), the HARQ timeline for a UECS depends on a number of factors, such as the joint processing capability in the UECS, latency of communication over a local wireless network between the UEs in the UECS, or the like. Based on its capabilities, the UECS can request uplink and/or downlink processing delay times or a UECS-specific HARQ timeline from a serving base station. The serving base station grants the uplink and/or downlink processing delay times or the UECS-specific HARQ timeline to the UECS in a layer-1, layer-2, or a layer-3 control message. The use of a UECS-specific HARQ timeline increases the reliability of HARQ signaling for uplink and downlink communication between the UECS and a base station(s).

A UE-coordination set is formed by multiple UEs assigned as a group to function together, similarly to a distributed antenna, for the benefit of a particular UE. The UE-coordination set includes a coordinating UE that coordinates joint-transmission and reception of downlink and/or uplink data for the particular UE (e.g., target UE) or multiple UEs in the UE-coordination set. By combining antennas and transmitters of multiple UEs in the UE-coordination set, the effective transmit power of the particular UE is significantly increased, and the effective signal quality is greatly improved. In joint-transmission, multiple transmitters (of either UEs or base stations) coordinate transmission of signals for the same set of data to increase transmit power, as compared to a single transmitter, and improve the link budget to a receiver. In joint-reception, multiple-receivers (of either UEs or base stations) each receive transmitted signals for the same set of data and accumulate the I/Q samples from each of the receivers to decode the combined I/Q samples into the set of data. By using joint-reception, the receivers provide increased receiver sensitivity, as compared to a single receiver, and improve the link budget for receiving the data from a transmitter.

Multiple UEs can each receive downlink data transmissions from the base station. Unlike conventional relay techniques, these UEs do not decode the downlink transmissions into data packets and then forward the data packets to a destination. Rather, the UEs demodulate and sample the downlink transmissions to produce I/Q samples. The UEs determine where to forward the I/Q samples of the downlink transmissions, such as to a coordinating UE or a target UE for decoding. In aspects, the target UE may be included in a subset of target UEs within the UE-coordination set. The coordinating UE (or the target UE) receives the I/Q samples from the other UEs in the UE-coordination set and stores the I/Q samples in a buffer memory for decoding. Then, the coordinating UE (or the target UE) synchronizes and decodes the stored I/Q samples into data packets for the target UE(s). Accordingly, the processing of the I/Q samples occurs at the coordinating UE or the target UE. In this way, the UE-coordination set acts as a distributed antenna for the target UE. The target UE includes its own antenna(s) and participates in the reception, demodulation, and sampling of downlink transmissions from the base stations, and forwards the sampled I/Q data to the coordinating UE. However, if the target UE is the coordinating UE, then the target UE does not forward the I/Q samples to itself.

In one use case, multiple UEs can form a UE-coordination set to transmit a message to a base station at a higher effective transmit power than would be possible for an individual UE. Additionally, those UEs can form a UE-coordination set to receive a message from the base station for one of the UEs with greater, effective receive sensitivity than would be possible for an individual UE. One of the multiple UEs acts as a coordinating UE for the UE-coordination set to aggregate data signals intended for a target UE and received by the UE-coordination set. Each of the UEs demodulates and samples the radio frequency signals and forwards the baseband samples to the coordinating UE using a local wireless network. Then, the coordinating UE aggregates and processes the samples to generate decoded data and provides the decoded data to the target UE. Alternatively, the coordinating UE can forward the stored samples to the target UE to allow the target UE to decode the data.

In aspects, the coordinating UE of a UECS determines capability information for the UECS and sends the capability information to a base station to indicate the number of parallel HARQ processes that the UECS can process. The number of simultaneous downlink HARQ processes the UECS can support may be the same or different than the number of simultaneous uplink HARQ processes the UECS can support. For each downlink or uplink, the base station assigns a HARQ process identifier to the UECS for the downlink or uplink. The UEs in the UECS can jointly transmit the capability information to the base station. For example, the coordinating UE determines the UECS capability information based on processing capabilities of the UEs in the UECS, delays (latencies) introduced by joint-transmission and joint-reception, or the like. The coordinating UE sends the capability information to the base station using Radio Resource Control (RRC) messages.

In another aspect, the UECS can request a downlink HARQ feedback timing gap for the acknowledgement of jointly received downlink communications. In other words, the UECS can request the base station to grant communication resources, at a time indicated by the downlink HARQ feedback timing gap, in which the UECS can transmit HARQ feedback to the base station. The downlink HARQ feedback timing gap is the time interval between the UECS jointly receiving downlink communication and the UECS jointly transmitting the HARQ feedback for the downlink communication. The downlink HARQ feedback timing gap depends on the capabilities of the UECS. The coordinating UE uses the capabilities of the UECS to generate a HARQ timeline for the UECS. Based on the timeline, the coordinating UE determines the downlink HARQ feedback timing gap and sends a request for the downlink HARQ feedback timing gap to the base station. In response to receiving the request from the coordinating UE, the base station can grant resources to the UECS to transmit HARQ feedback at the time indicated by the downlink HARQ feedback timing gap. For example, the base station may grant resources (e.g., time-frequency resources, such as one or more resource elements) in an uplink time slot that occurs at a time no less than the timing gap after a downlink timeslot in which the downlink data to be acknowledged via HARQ feedback is transmitted to the UECS.

In a further aspect, the UECS can request an uplink data timing specifying a time between the joint-reception of an uplink grant from the base station and the joint-transmission of uplink data using the uplink grant. In other words, the UECS can request the base station to grant communication resources, based on the uplink data timing, in which the UECS can jointly transmit uplink data. The uplink data timing depends on the capabilities of the UECS for joint-reception of the resource grant and joint-transmission of the uplink data. The coordinating UE uses the capabilities of the UECS to generate a request for the uplink data timing for the UECS. The coordinating UE sends the request for the uplink data timing to the base station. In response to receiving the request from the coordinating UE, the base station grants resources to the UECS for uplink data transmission relative to the time at which the base station transmits the resource grant to the UECS and receives the uplink data from the UECS using the granted resources. For example, the base station may grant resources (e.g., time-frequency resources, such as one or more resource elements) in an uplink time slot that occurs at a time no less than the uplink data timing after a timeslot in which the uplink grant is transmitted to the UECS.

Example Environments

FIG. 1 illustrates an example environment 100, which includes multiple user equipment 110 (UE 110), illustrated as UE 111, UE 112, and UE 113. Each UE 110 can communicate with one or more base stations 120 (illustrated as base stations 121 and 122) through one or more wireless communication links 130 (wireless link 130), illustrated as wireless link 131. Each UE 110 in a UE-coordination set 108 (illustrated as UE 111, UE 112, and UE 113) can communicate with a coordinating UE of the UE-coordination set and/or a target UE in the UE-coordination set through one or more local wireless network connections (e.g., WLAN, Bluetooth, NFC, a personal area network (PAN), WiFi-Direct, IEEE 802.15.4, ZigBee, Thread, millimeter wavelength communication (mmWave), or the like) such as local wireless network connections 133, 134, and 135. Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, an Internet-of-things (IoT) device (e.g., sensor node, controller/actuator node, combination thereof), and the like. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, or the like, or any combination thereof.

The base stations 120 communicate with the user equipment 110 using the wireless link 131 and, which may be implemented as any suitable type of wireless link. The wireless link 131 includes control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN, or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an S1 interface for control-plane signaling and user-plane data communications when connecting to an Evolved Packet Core (EPC) network. The base stations 121 and 122 can communicate using an Xn Application Protocol (XnAP) through an Xn interface or using an X2 Application Protocol (X2AP) through an X2 interface, at 106, to exchange user-plane and control-plane data. The user equipment 110 may connect, via the core network 150, to public networks, such as the Internet 160 to interact with a remote service 170.

The base station 121 can specify a set of UEs (e.g., the UE 111, UE 112, and UE 113) to form a UE-coordination set (e.g., the UE-coordination set 108) for joint-transmission and joint-reception of signals for a target UE (e.g., the UE 112). The base station 121 may select UE 111 to act as the coordinating UE since the UE 111 is located between UE 112 and UE 113 or because the UE 111 is capable of communicating with each of the other UEs 112 and 113 in the UE-coordination set. The base station 121 selects UE 111 to coordinate messages and I/Q samples sent between the base station 121 and the UEs 111, 112, 113 for the target UE 112. Communication among the UEs can occur using a local wireless network, such as a PAN, NFC, Bluetooth, WiFi-Direct, local mmWave link, etc. In this example, all three of the UEs 111, 112, 113 receive RF signals from the base station 121. The UE 111, UE 112, and UE 113 demodulate the RF signals to produce baseband I/Q analog signals and sample the baseband I/Q analog signals to produce I/Q samples. The UE 112 and the UE 113 forward the I/Q samples along with system timing information (e.g., system frame number (SFN)) using the local wireless network to the coordinating UE 111 using its own local wireless network transceiver. The coordinating UE 111 then uses the timing information to synchronize and combine the I/Q samples and processes the combined signal to decode data packets for the target UE 112. The coordinating UE 111 then transmits the data packets to the target UE 112 using the local wireless network.

When the target UE 112 has uplink data to send to the base station 121, the target UE transmits the uplink data to the coordinating UE 111 that uses the local wireless network to distribute the uplink data, as I/Q samples, to each UE in the UE-coordination set 108. Each UE in the UE-coordination set 108 synchronizes with the base station 121 for timing information and its data transmission resource assignment. Then, all three UEs in the UE-coordination set 108 jointly transmit the uplink data to the base station 121. The base station 121 receives the transmitted uplink data from the UEs 111, 112, 113 and jointly processes the combined signal to decode the uplink data from the target UE 112.

Example Devices

Figure 2:
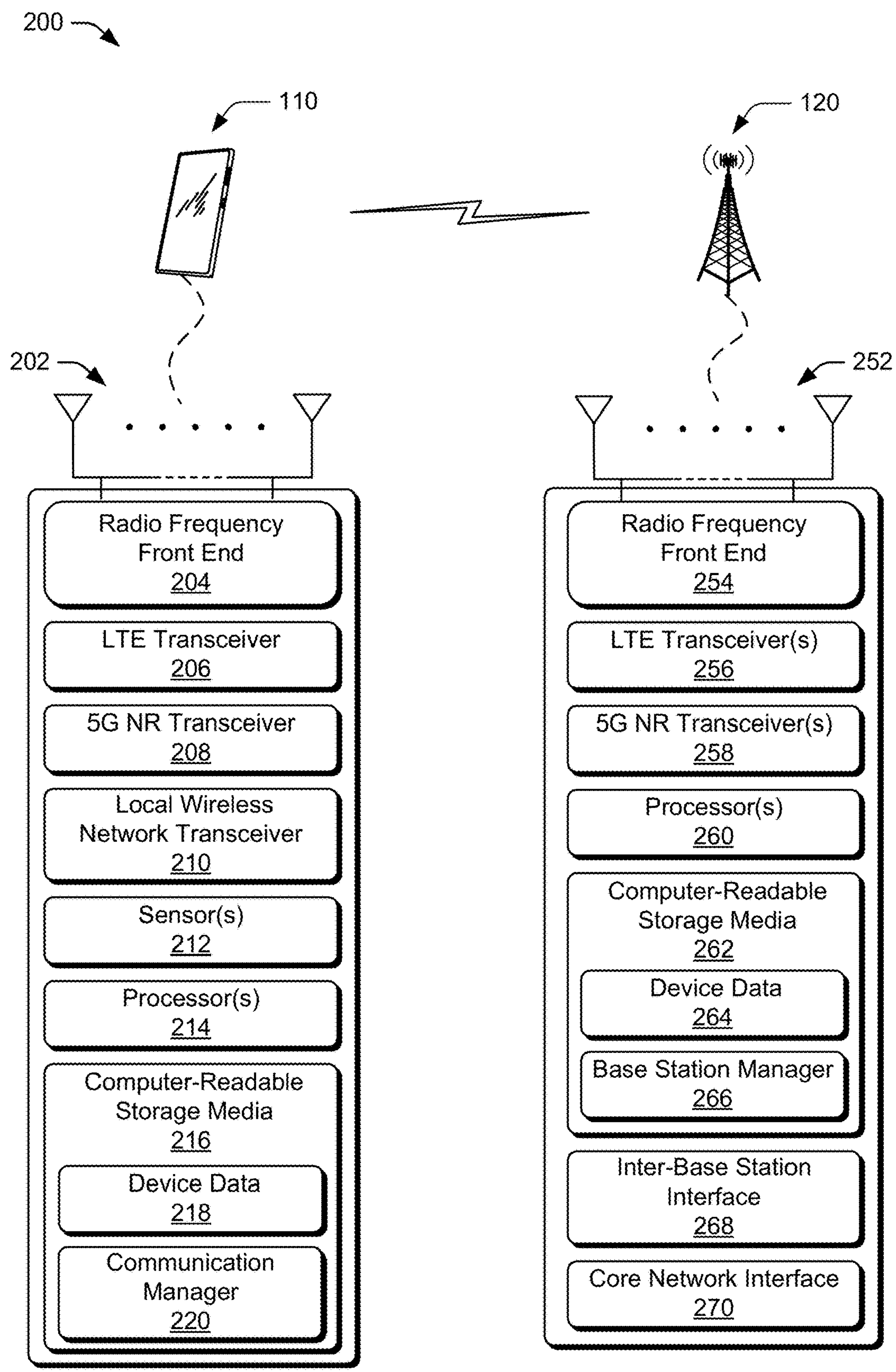
FIG. 2 illustrates an example device diagram of a user equipment and a serving cell base station.

FIG. 2 illustrates an example device diagram 200 of a user equipment and a base station. In aspects, the device diagram 200 describes devices that can implement various aspects of UE-coordination-set hybrid automatic repeat request. Included in FIG. 2 are the multiple UE 110 and the base stations 120. The multiple UE 110 and the base stations 120 may include additional functions and interfaces that are omitted from FIG. 2 for the sake of clarity. The UE 110 includes antennas 202, a radio frequency front end 204 (RF front end 204), and radio-frequency transceivers (e.g., an LTE transceiver 206 and a 5G NR transceiver 208) for communicating with base stations 120 in the 5G RAN 141 and/or the E-UTRAN 142. The UE 110 includes one or more additional transceivers (e.g., local wireless network transceiver 210) for communicating over one or more wireless local wireless networks (e.g., WLAN, Bluetooth, NFC, a personal area network (PAN), WiFi-Direct, IEEE 802.15.4, ZigBee, Thread, mmWave, or the like) with at least the coordinating UE, and/or the target UE, of the UE-coordination set. The RF front end 204 of the UE 110 can couple or connect the LTE transceiver 206, the 5G NR transceiver 208, and the local wireless network transceiver 210 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards. In addition, the RF front end 204 can be tuned to, and/or be tunable to, one or more frequency bands defined and implemented by the local wireless network transceiver 210 to support transmission and reception of communications with other UEs in the UE-coordination set over a local wireless network.

The UE 110 includes sensor(s) 212 that can detect various properties such as temperature, supplied power, power usage, battery state, or the like. As such, the sensors 212 may include any one or a combination of temperature sensors, thermistors, battery sensors, and power usage sensors.

The UE 110 also includes processor(s) 214 and computer-readable storage media 216 (CRM 216). The processor 214 may be a single core processor or a multiple core processor composed of a variety of materials, such as silicon, polysilicon, high-K dielectric, copper, and so on. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data 218 of the UE 110. The device data 218 includes user data, multimedia data, beamforming codebooks, applications, and/or an operating system of the UE 110, which are executable by processor(s) 214 to enable user-plane communication, control-plane signaling, and user interaction with the UE 110.

CRM 216 also includes a communication manager 220 (e.g., a communication manager application 220). Alternately or additionally, the communication manager 220 may be implemented in whole or part as hardware logic or circuitry integrated with or separate from other components of the UE 110. In at least some aspects, the communication manager 220 configures the RF front end 204, the LTE transceiver 206, the 5G NR transceiver 208, and/or the local wireless network transceiver 210 to implement the techniques described herein for UE-coordination-set hybrid automatic repeat request.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with any UE 110 in a UE-coordination set.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266 (e.g., base station manager application 266). Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base station manager 266 configures to exchange user-plane and control-plane data between another base station 120, to manage the communication of the base stations 120 with the UE 110. The base stations 120 include a core network interface 270 that the base station manager 266 configures to exchange user-plane and control-plane data with core network functions and entities.

Network Protocol Stack

Figure 3:
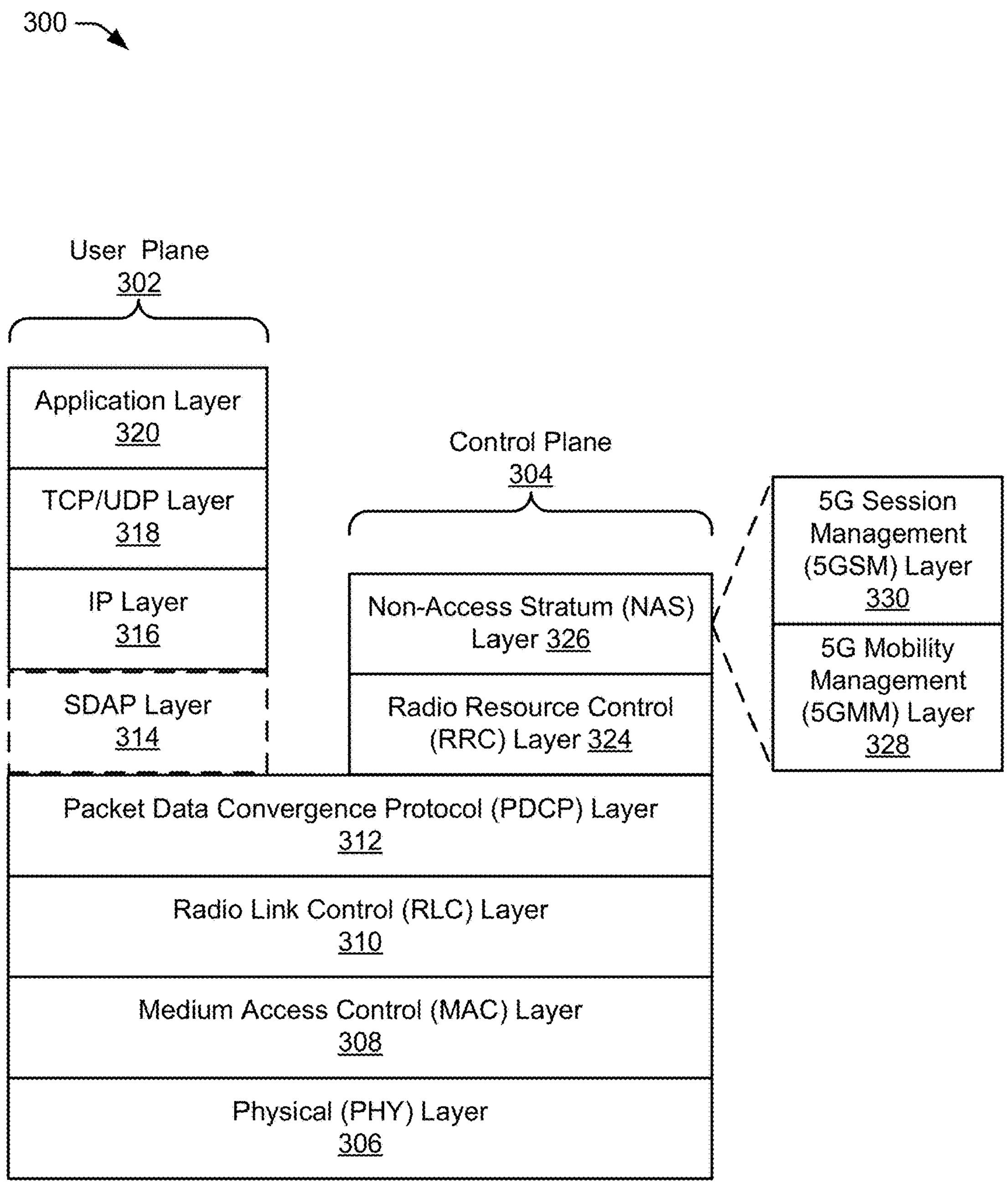
FIG. 3 illustrates an example block diagram of a wireless network stack model in which various aspects of user equipment-coordination set hybrid automatic repeat request can be implemented.

FIG. 3 illustrates an example block diagram 300 of a wireless network protocol stack model 300 (protocol stack 300). The protocol stack 300 characterizes a communication system for the example environment 100, in which various aspects of user equipment-coordination set hybrid automatic repeat request can be implemented. The protocol stack 300 includes a user plane 302 and a control plane 304. Upper layers of the user plane 302 and the control plane 304 share common lower layers in the protocol stack 300. Wireless devices, such as the UE 110 or the base station 120, implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical (PHY) layer 306 (layer-1), a Medium Access Control (or Media Access Control) (MAC) layer 308 (layer-2), a Radio Link Control (RLC) layer 310 (layer-3), and a PDCP layer 312. The PHY layer 306 provides hardware specifications for devices that communicate with each other. As such, the PHY layer 306 establishes how devices connect to each other, assists in managing how communication resources are shared among devices, and the like.

The MAC layer 308 specifies how data is transferred between devices. Generally, the MAC layer 308 provides a way in which data packets being transmitted are encoded and decoded into bits as part of a transmission protocol.

The RLC layer 310 provides data transfer services to higher layers in the protocol stack 300. Generally, the RLC layer 310 provides error correction, packet segmentation and reassembly, and management of data transfers in various modes, such as acknowledged, unacknowledged, or transparent modes.

The PDCP layer 312 provides data transfer services to higher layers in the protocol stack 300. Generally, the PDCP layer 312 provides transfer of user plane 302 and control plane 304 data, header compression, ciphering, and integrity protection.

Above the PDCP layer 312, the stack splits into the user-plane 302 and the control-plane 304. Layers of the user plane 302 include an optional Service Data Adaptation Protocol (SDAP) layer 314, an Internet Protocol (IP) layer 316, a Transmission Control Protocol/User Datagram Protocol (TCP/UDP) layer 318, and an application layer 320, which transfers data using the wireless link 106. The optional SDAP layer 314 is present in 5G NR networks. The SDAP layer 314 maps a Quality of Service (QoS) flow for each data radio bearer and marks QoS flow identifiers in uplink and downlink data packets for each packet data session. The IP layer 316 specifies how the data from the application layer 320 is transferred to a destination node. The TCP/UDP layer 318 is used to verify that data packets intended to be transferred to the destination node reached the destination node, using either TCP or UDP for data transfers by the application layer 320. In some implementations, the user plane 302 may also include a data services layer (not shown) that provides data transport services to transport application data, such as IP packets including web browsing content, video content, image content, audio content, or social media content.

The control plane 304 includes a Radio Resource Control (RRC) layer 324 and a Non-Access Stratum (NAS) layer 326. The RRC layer 324 establishes and releases connections and radio bearers, broadcasts system information, or performs power control. The RRC layer 324 also controls a resource control state of the UE 110 and causes the UE 110 to perform operations according to the resource control state. Example resource control states include a connected state (e.g., an RRC connected state) or a disconnected state, such as an inactive state (e.g., an RRC inactive state) or an idle state (e.g., an RRC idle state). In general, if the UE 110 is in the connected state, the connection with the base station 120 is active. In the inactive state, the connection with the base station 120 is suspended. If the UE 110 is in the idle state, the connection with the base station 120 is released. Generally, the RRC layer 324 supports 3GPP access but does not support non-3GPP access (e.g., WLAN communications).

The NAS layer 326 provides support for mobility management (e.g., using a Fifth-Generation Mobility Management (5GMM) layer 328) and packet data bearer contexts (e.g., using a Fifth-Generation Session Management (5GSM) layer 330) between the UE 110 and entities or functions in the core network, such as the Access and Mobility Management Function 152 (AMF 152) of the 5GC 150 or the like. The NAS layer 326 supports both 3GPP access and non-3GPP access.

In the UE 110, each layer in both the user plane 302 and the control plane 304 of the protocol stack 300 interacts with a corresponding peer layer or entity in the base station 120, a core network entity or function, and/or a remote service, to support user applications and control operation of the UE 110 in the RAN 140.

UECS HARQ Timelines

Figure 4:
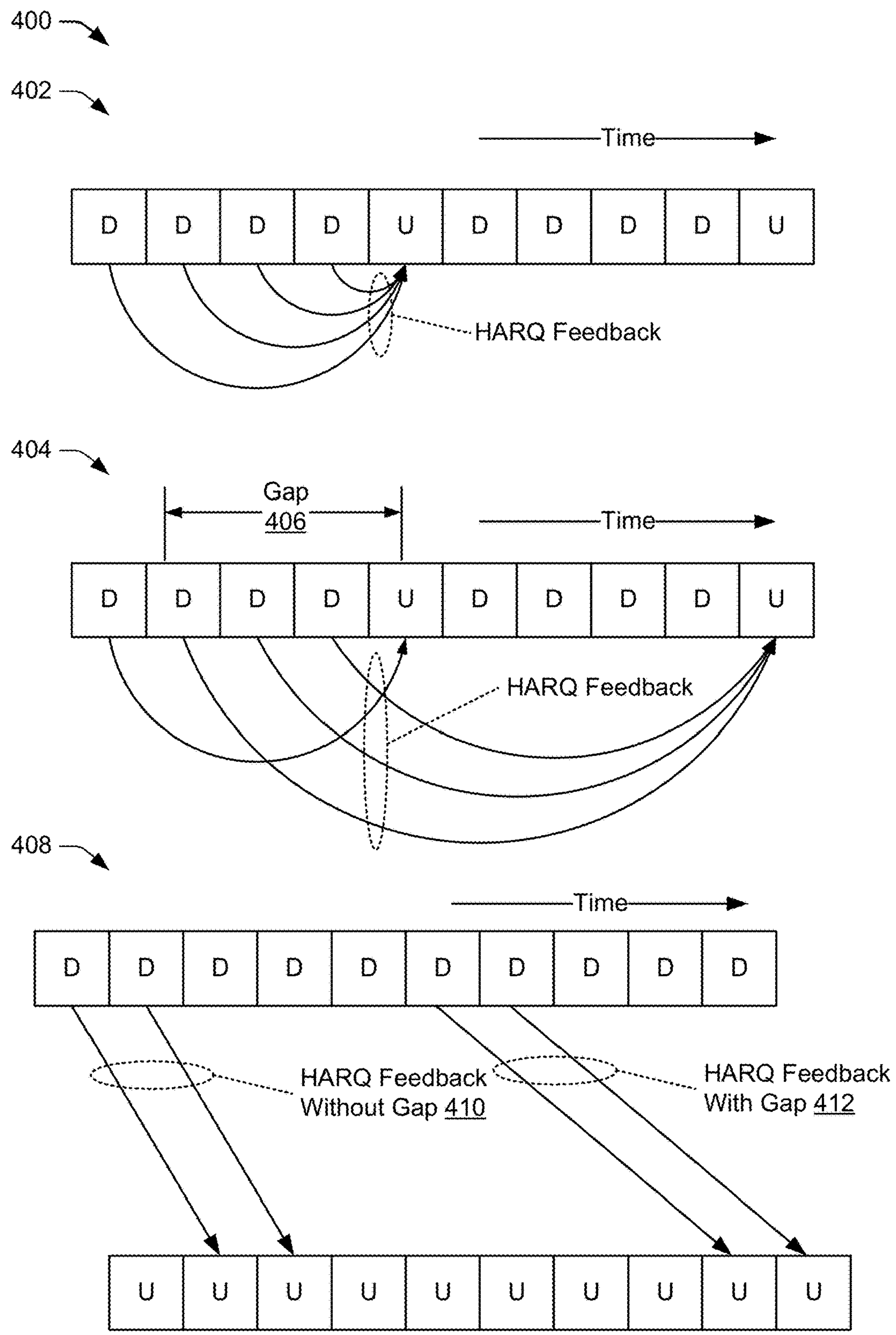
FIG. 4 illustrates example HARQ timelines for a user-equipment-coordination set and a base station in accordance with aspects of user equipment-coordination set hybrid automatic repeat request.

FIG. 4 illustrates example HARQ timelines for a user-equipment-coordination set and a base station in accordance with aspects of user equipment-coordination set hybrid automatic repeat request. Because joint-transmission and/or joint-reception by a UECS includes communications among the UEs in the UECS over a local wireless network, the maximum delay for HARQ feedback between a base station and a UECS (e.g., for a synchronous HARQ process or for an asynchronous HARQ process) may be longer than those expected with a single UE (such as those specified in 3GPP TS 38.213). The longer maximum delay accounts for the latencies due to the coordination of joint-transmission and/or joint-reception within the UECS for downlink and/or uplink HARQ feedback. Timeline 402 illustrates HARQ acknowledgements for Time Division Duplex (TDD) communication including downlink ("D") timeslots and uplink ("U") timeslots between a user equipment and a base station. In example timeline 402, the UE transmits HARQ feedback for the first four downlink ("D") timeslots in the first uplink ("U") timeslot. Timeline 402 assumes that the HARQ feedback timing gap is less than one slot. This may be achievable in some UECS implementations but not achievable in other UECS implementations due to processing and local wireless network transmission latencies among the UEs 111, 112, 113 in the UECS 108. In these longer-latency situations, a UECS may request a minimum downlink HARQ feedback timing gap.

Timeline 404 illustrates HARQ acknowledgements for TDD communication for a UECS when the UECS requests a minimum downlink HARQ feedback timing gap 406. In example timeline 404, the time between the first downlink timeslot and the first uplink timeslot exceeds the downlink HARQ feedback timing gap 406, and the UECS transmits HARQ feedback for the first downlink timeslot in the first uplink timeslot similar to timeline 402. The time between the second, third, and fourth downlink timeslots and the first uplink timeslot, however, is less than the downlink HARQ feedback timing gap 406, and the time between the second, third, and fourth downlink timeslots and the second uplink timeslot shown is greater than the downlink HARQ feedback timing gap 406. Thus, the UECS transmits HARQ feedback for the second, third, and fourth downlink timeslots in the second uplink timeslot.

Timeline 408 illustrates HARQ acknowledgements for Frequency Division Duplex (FDD) communication with a downlink channel including downlink ("D") timeslots and an uplink channel including uplink ("U") timeslots. At 410, HARQ feedback without a specified downlink HARQ feedback timing gap is illustrated. For example, the timing of the HARQ feedback at 410 may be typical of the timing of feedback from a single UE to a base station. At 412, a UECS transmits HARQ feedback based on a downlink HARQ feedback timing gap that delays the transmission by two uplink timeslots to account for communication and coordination within the UECS as compared to the single UE HARQ feedback illustrated at 410. Additionally or optionally, the HARQ feedback timing gap for a UECS using TDD communication may be the same or different as the HARQ feedback timing gap for FDD communications. The coordinating UE 111 can report a first HARQ feedback timing gap for TDD communication and a second HARQ feedback timing gap for FDD communication. Alternatively, the coordinating UE 111 can report a single HARQ feedback timing gap based on the current communication mode (TDD or FDD) of the UECS.

UE-Coordination Set Hybrid Automatic Repeat Request

Figure 5:
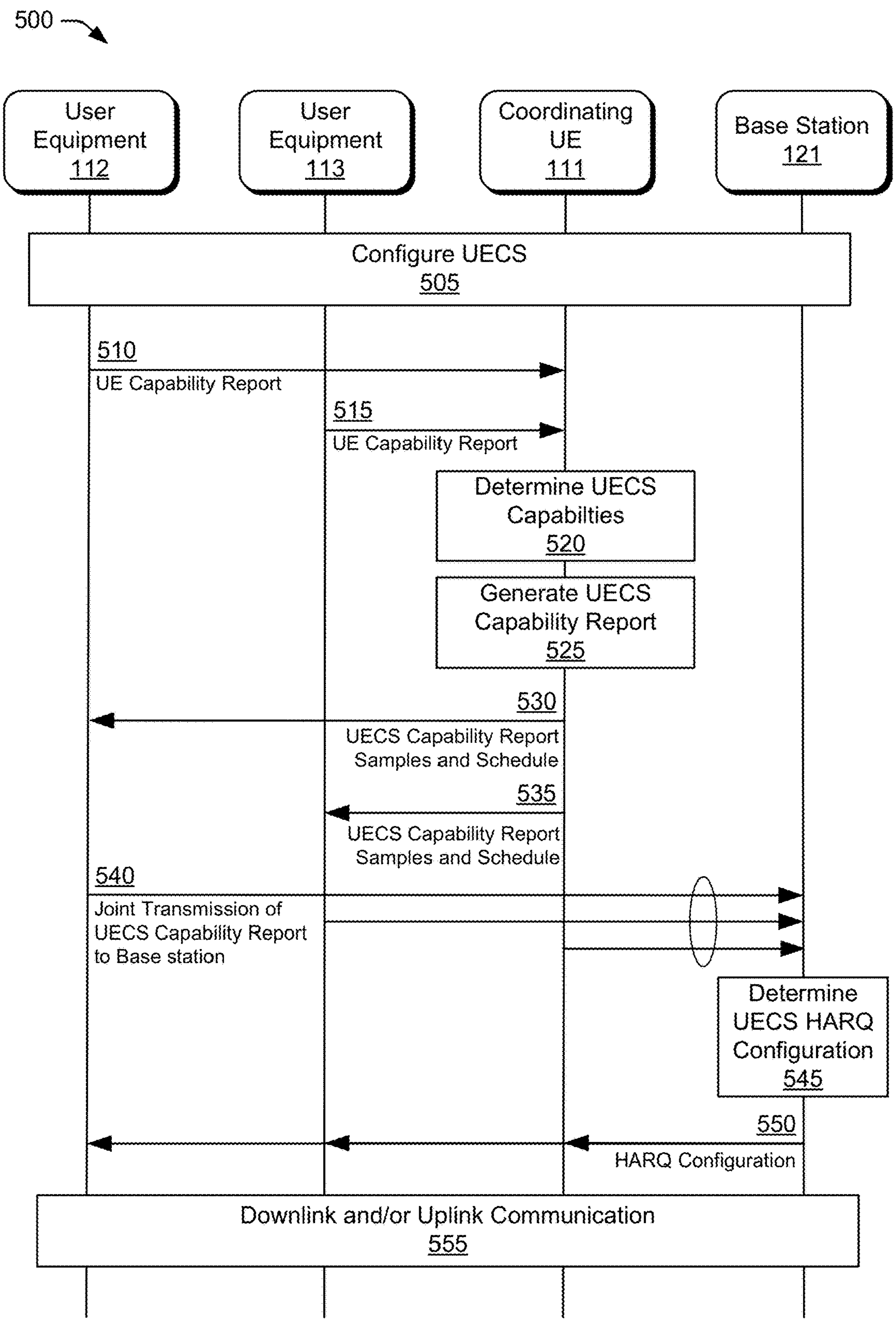
FIG. 5 illustrates example data and control transactions between devices of a user-equipment-coordination set and a base station for HARQ configuration of a user-equipment-coordination set in accordance with aspects of user equipment-coordination set hybrid automatic repeat request.

FIG. 5 illustrates data and control transactions between devices of a user-equipment-coordination set and a base station for HARQ configuration from a user-equipment-coordination set in accordance with aspects of user equipment-coordination set hybrid automatic repeat request. Although not illustrated for the sake of illustration clarity, various acknowledgements for messages illustrated in FIG. 5 may be implemented to ensure reliable operations of user equipment-coordination set hybrid automatic repeat request.

At 505, the base station 121 configures a UECS (e.g., the UECS 108) including the UE 111, the UE 112, and the UE 113. The base station 121 configures the UE 111 as the coordinating UE for the UECS. Although, for the sake of illustration clarity, the UECS in FIG. 5 is illustrated as including three UEs, any suitable number of UEs may be included in the UECS.

At 510, the UE 112 sends its capabilities to the coordinating UE 111 in a UE capability report using the local wireless network, and at 515, the UE 113 sends its capabilities to the coordinating UE 111 in a UE capability report using the local wireless network. The UE capabilities may include processing resources of the respective UE, remaining battery capacity of the respective UE, or the like.

At 520, the coordinating UE 111 determines capability information for the UECS 108. The coordinating UE 111 determines the UECS capabilities based on its own capabilities and the capabilities received from other UEs in the UECS (UE 112, UE 113). For example, the coordinating UE 111 determines the capability information based on one or more of: processing capabilities of the UEs in the UECS; delays (latencies) introduced by joint-transmission and joint-reception, such as latencies associated with scheduling joint-transmission or joint-reception; latencies for communications among the UEs, over the local wireless network in the UECS 108 to coordinate joint-transmission and/or joint-reception; the available battery capacity of the UEs in the UECS; or the like. The UECS capability information includes one or more of: the number of simultaneous HARQ processes (uplink HARQ processes, downlink HARQ processes, or both) that the UECS can support; any combination of one or more HARQ feedback timing gaps for the UECS (e.g., a single HARQ feedback timing gap, a HARQ feedback timing gap for DL communications, a HARQ feedback timing gap for UL communications, a HARQ feedback timing gap for TDD communications, and/or a HARQ feedback timing gap for FDD communications); the uplink data timing specifying a time between the joint-reception of an uplink grant from the base station and the joint-transmission of uplink data using the uplink grant for the UECS; or the like. For example, based on the capabilities of the UEs in the UECS, the coordinating UE 111 may optionally specify a number of simultaneous HARQ processes that is fewer than the maximum HARQ processes specified by a communications standard (e.g., fewer than eight HARQ processes for LTE or fewer than 16 HARQ processes for 5G NR). In another example, the coordinating UE determines the HARQ feedback timing gap for downlink communications by evaluating one or more of: latencies for communications within the local wireless network for coordination of HARQ feedback for a timeslot of downlink data; a level of processing capabilities available for processing of the jointly-received timeslot of downlink data; the available battery capacity of UEs in the UECS; or the like.

At 525, the coordinating UE 111 generates the UECS capability report from the determined UECS capability information and encodes the UECS capability report to generate I/Q samples for joint-transmission of the UECS capability report to the base station 121. For example, the coordinating UE 111 generates an RRC message that includes the UECS capability report that in turn is encoded into I/Q samples.

At 530 and 535, the coordinating UE 111 sends the generated I/Q samples and a schedule for transmission of the I/Q samples to the other UEs (112, 113) in the UECS 108 using the local wireless network. At 540, the UEs (111, 112, and 113) in the UECS jointly transmit the UECS capability report to the base station 121.

At 545, the base station 121 uses the received UECS capability report to determine a HARQ configuration for uplink and/or downlink communications between the base station 121 and the UECS 108. For example, based on the number of simultaneous HARQ processes indicated in the UECS capability report and any communications standards limitations (e.g., fewer than eight HARQ processes for LTE or fewer than 16 HARQ processes for 5G NR), the base station 121 configures a maximum number of simultaneous downlink and/or uplink HARQ processes that the base station 121 will use when communicating with the UECS 108. Based on HARQ feedback timing gap for DL communications indicated in the UECS capability report, the base station 121 configures timers for the HARQ processes for the UECS. Based on the uplink data timing indicated in the UECS capability report, the base station 121 allocates time-frequency resources to receive UL data from the UECS at a time equal to the indicated uplink data timing after the base station transmits an uplink grant to the UECS.

At 550, the base station 121 transmits a HARQ Configuration message that includes an indication of the maximum number of simultaneous HARQ processes that the base station 121 will use for communication with the UECS 108. Also at 550, for each HARQ process, the base station assigns a HARQ process identifier to the UECS 108, as opposed to assigning HARQ process identifiers to individual UEs. Also, at 550, the base station 121 may transmit a HARQ Configuration message that includes an uplink resource grant to the UECS 108.

In another example, the UECS capability report includes an indication of a downlink HARQ feedback timing gap for the UECS. The base station 121 determines a resource grant for downlink communication with the UECS 108 based on the UECS capability report. The resource grant includes a grant for HARQ feedback based on the downlink HARQ feedback timing gap, and at 550, the base station 121 transmits a HARQ Configuration message that includes the resource grant to the UECS 108.

In a further example, the UECS capability report includes an indication of an uplink data timing for the UECS. The base station 121 determines a resource grant for uplink communication with the UECS 108 based on the UECS capability report.

In aspects, although described separately, the UECS capability report may include any combination of the maximum number of simultaneous HARQ processes supported by the UECS 108, the indication of a downlink HARQ feedback timing gap for the UECS 108, the indication of an uplink HARQ feedback timing gap for the UECS 108, or the indication of an uplink data timing for the UECS 108. The HARQ Configuration message transmitted at 550 may simply provide an acknowledgement of the UECS capability report or the HARQ Configuration message may include downlink and/or uplink resource grants or resource grants may be transmitted separately by the base station 121 to the UECS 108.

At 555, using the UECS HARQ configuration, the base station 121 and the UECS 108 communicate downlink and/or uplink data. For example, for each timeslot of downlink data transmitted to the UECS 108, the base station 121 expects an ACK or NACK at a timing based on the downlink HARQ feedback timing gap indicated to the base station 121 in the UECS capability report.

When the UECS 108 determines that there is uplink data to transmit, the UECS 108 transmits a scheduling request to the base station 121 to request resources for the uplink transmission. The UECS 108 receives an uplink resource grant from the base station 121 and transmits the uplink data using the resources in the uplink resource grant and using the uplink data timing after the UECS 108 receives the uplink resource grant. For each timeslot of uplink data transmitted by the UECS 108 to the base station 121, the UECS expects an ACK or NACK from the base station 121 at a timing based on the HARQ feedback timing gap for UL communications.

Although the determination of UE capabilities and generation of the UECS capability report (shown at 510, 515, 520, and 525) is illustrated as occurring once after the configuration of the UECS at 505, the UECS may repeat these steps periodically or based on a change in the capabilities of one or more UEs in the UECS, such as a UE leaving the UECS, a new UE joining the UECS, a change in the capability of a UE (e.g., low remaining battery capacity of the UE), or the like. In an aspect, the coordinating UE 111 may transmit a capability request (not illustrated in FIG. 5) to UEs in the UECS 108 to request the UEs to transmit an updated UE capability report to the coordinating UE 111.

Example Methods

Example methods 600-800 are described with reference to FIGS. 6-8 in accordance with one or more aspects of user equipment-coordination set hybrid automatic repeat request. The order in which the method blocks are described are not intended to be construed as a limitation, and any number of the described method blocks can be skipped, repeated, or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
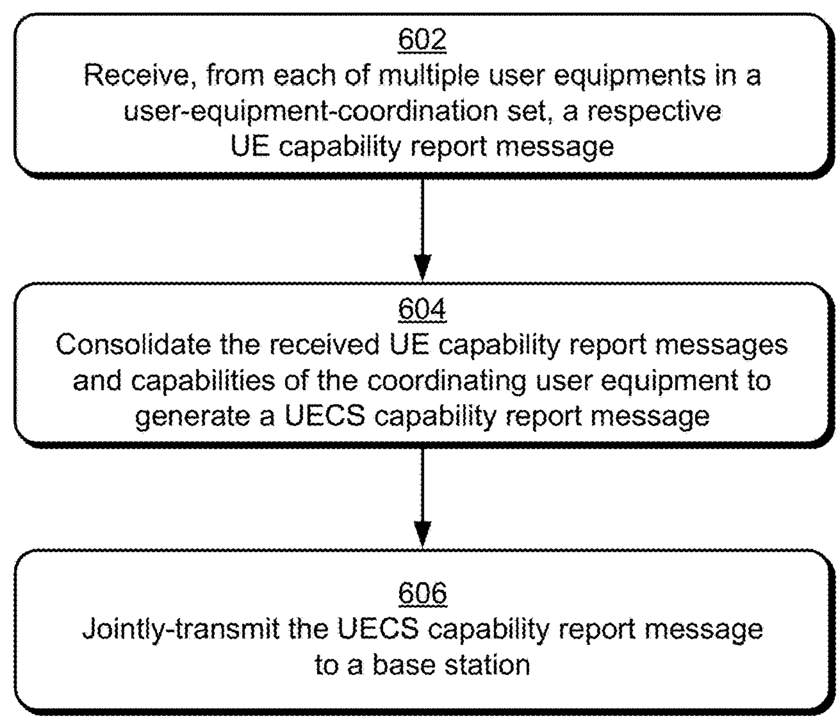
FIG. 6 illustrates an example method of user equipment-coordination set hybrid automatic repeat request as generally related to a coordinating user equipment in accordance with aspects of the techniques described herein.

FIG. 6 illustrates example method(s) 600 of user equipment-coordination set hybrid automatic repeat request as generally related to a coordinating user equipment. At 602, a coordinating user equipment receives, from each of multiple user equipments in the user-equipment-coordination set, a respective UE capability report message. For example, a coordinating user equipment (e.g., the coordinating UE 111) receives, from each of multiple user equipments (e.g., UE 112, UE 113) in the user-equipment-coordination set (e.g., the UECS 108), a respective UE capability report message. The UE capability report message may include processing resources of the respective UE, remaining battery capacity of the respective UE, or the like.

At 604, the coordinating user equipment consolidates the received UE capability report messages and capabilities of the coordinating user equipment to generate a UECS capability report message. For example, the coordinating user equipment 111 consolidates the received UE capability report messages and the capabilities of the coordinating user equipment 111 to generate a UECS capability report message.

At 606, the coordinating user equipment jointly transmits the UECS capability report message to a base station, directing the base station to evaluate resource allocations for the user-equipment-coordination set. For example, the coordinating UE 111 configures the UECS 108 to jointly transmit the consolidated report (at 540) to a base station (e.g., the base station 121). The joint-transmission can include the coordinating UE 111 processing the generated, consolidated report message to produce I/Q samples for the joint-transmission and forwarding the I/Q samples (at 530 and 535) using a local wireless network to the multiple user equipments 112, 113 to jointly transmit the consolidated report message.

Figure 7:
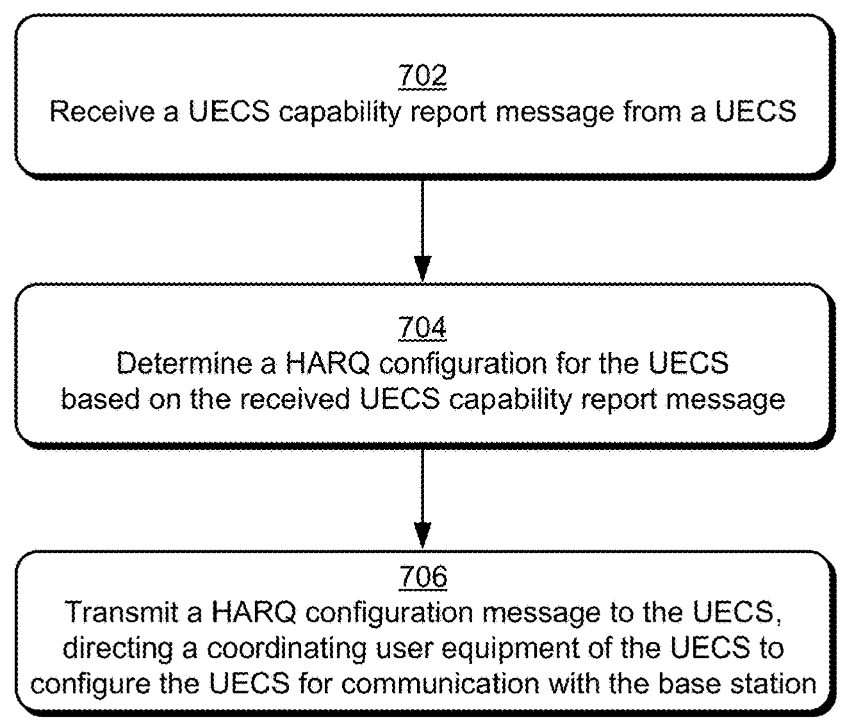
FIG. 7 illustrates an example method of user equipment-coordination set hybrid automatic repeat request as generally related to a base station in accordance with aspects of the techniques described herein.

FIG. 7 illustrates example method(s) 700 of user equipment-coordination set hybrid automatic repeat request as generally related to a base station. At 702, a base station receives a UECS capability report message from a UECS. For example, a base station (e.g., the base station 121) receives a UECS capability report message (at 540) from a UECS (e.g., the UECS 108). The UECS capability report message may include one or more of: the number of simultaneous uplink and/or downlink HARQ processes that the UECS 108 can support, the downlink HARQ feedback timing gap for the UECS 108, the uplink data timing for the UECS 108, or the like.

At 704, the base station determines a HARQ configuration for the UECS based on the received UECS capability report message. For example, the base station manager application 266 of the base station 121 determines a HARQ configuration for the UECS 108 (at 545) based on the capabilities of the UECS 108 indicated in the received UECS capability report message. The UECS capability report message may include one or more of: the number of simultaneous HARQ processes that the UECS 108 can support, the downlink HARQ feedback timing gap for the UECS 108, the uplink data timing for the UECS 108, or the like. The base station manager application 266 may store the determined HARQ configuration in the CRM 262 of the base station 121 for use in configuring (e.g., determining resource grants) uplink and/or downlink communication with the UECS 108.

At 706, the base station transmits a HARQ configuration message to the UECS, directing a coordinating user equipment of the UECS to configure the UECS for communication with the base station. For example, the base station 121 transmits a HARQ configuration message to the UECS 108 (at 550), directing the coordinating user equipment 111 of the UECS 108 to configure the UECS 108 for communication with the base station 121. The HARQ Configuration message may provide an acknowledgement of the UECS capability report to the UECS 108. The HARQ Configuration message may include a downlink and/or uplink resource grant.

Figure 8:
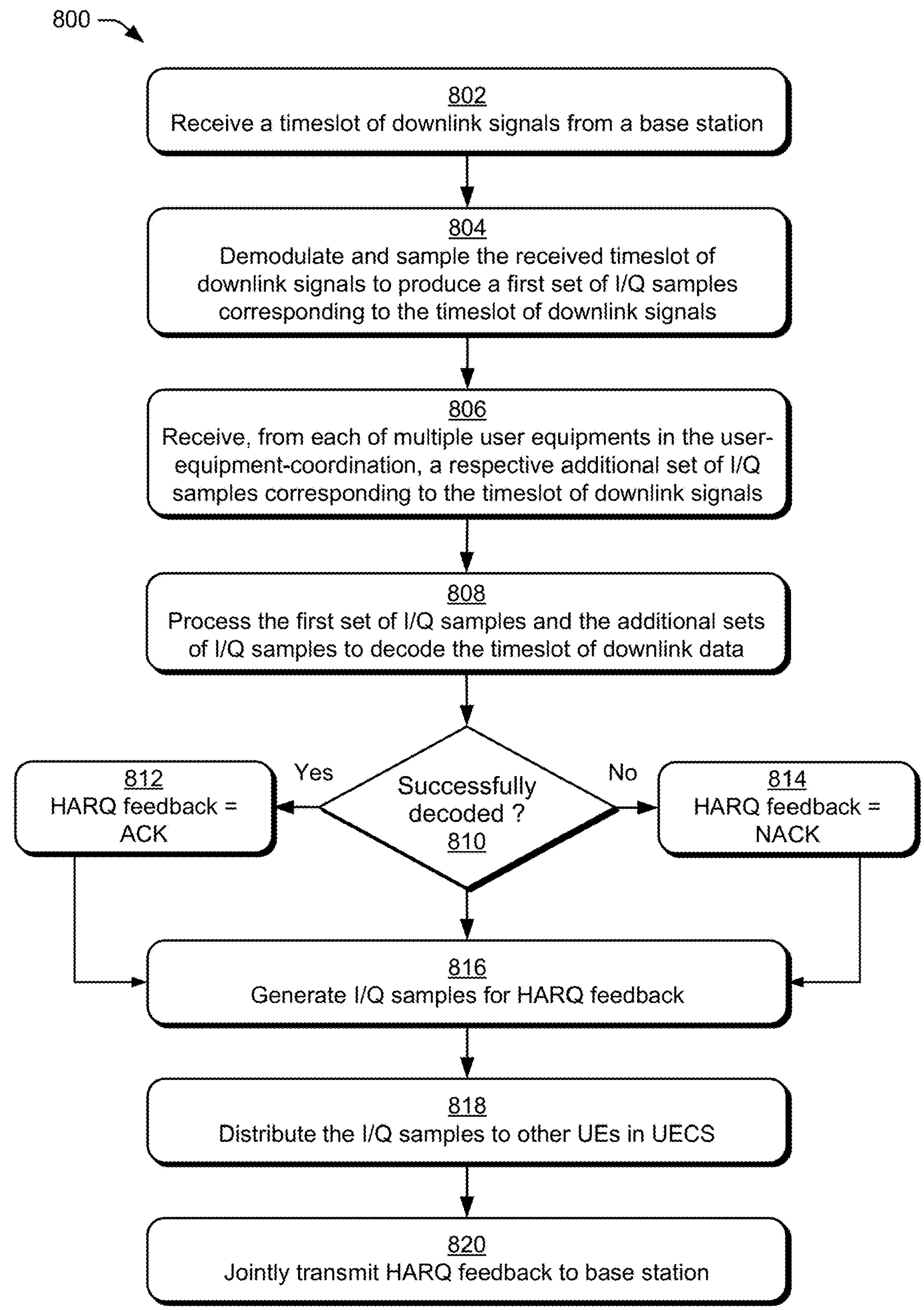
FIG. 8 illustrates an example method of user equipment-coordination set hybrid automatic repeat request as generally related to a coordinating user equipment in accordance with aspects of the techniques described herein.

FIG. 8 illustrates example method(s) 800 of user equipment-coordination set hybrid automatic repeat request as generally related to a coordinating user equipment. At 802, after establishing a HARQ configuration between a UECS and a base station, as illustrated in example methods 600 and 700, a coordinating user equipment receives a timeslot of downlink signals from a base station. For example, a coordinating user equipment (e.g., the coordinating UE 111) receives, from a base station (e.g., the base station 121), a timeslot of downlink signals.

At 804, the coordinating user equipment demodulates and samples the received timeslot of downlink signals to produce a first set of I/Q samples corresponding to the timeslot of downlink signals. For example, the coordinating UE 111 demodulates and samples the received timeslot of downlink signals to produce a first set of I/Q samples corresponding to the timeslot of downlink signals.

At 806, the coordinating user equipment receives, from each of multiple user equipments in the user-equipment-coordination set, a respective additional set of I/Q samples corresponding to the timeslot of downlink signals. For example, the coordinating UE 111 receives I/Q samples from the UE 112 and the UE 113 using a local wireless network.

At 808, the coordinating user equipment processes the first set of I/Q samples and the additional sets of I/Q samples to decode the timeslot of downlink data. For example, the coordinating UE 111 aligns and accumulates the first set of I/Q samples with the additional sets of I/Q samples to decode the timeslot of downlink data.

At 810, the coordinating user equipment determines if the timeslot of downlink data was successfully decoded. At 812, if the timeslot of downlink was data was successfully decoded, the coordinating user equipment determines to send an ACK as the HARQ feedback for the timeslot of downlink data. At 814, if the timeslot of downlink was data was not successfully decoded, the coordinating user equipment determines to send a NACK as the HARQ feedback for the timeslot of downlink data.

At 816, the coordinating user equipment generates I/Q samples for the HARQ feedback. For example, the coordinating user equipment 111 generates I/Q samples for joint transmission of the HARQ feedback to the base station 121.

At 818, the coordinating user equipment distributes the I/Q samples to other UEs in the UECS. For example, the coordinating user equipment 111 distributes the I/Q samples to the UEs 112 and 113 in the UECS 108 via a wireless local network using connections 134, 135. The coordinating user equipment 111 may include an indication of a timing and/or uplink resources for joint-transmission of the HARQ feedback with the I/Q samples sent to the UEs 112 and 113.

At 820, the coordinating user equipment jointly transmits the HARQ feedback to the base station. For example, the coordinating user equipment 113 jointly transmits the HARQ feedback to the base station 121 along with the UE 112 and the UE 113 using the indicated timing and/or uplink resources.

In the following some examples are described—

Example 1: A method for reporting hybrid automatic repeat request, HARQ, capabilities by a user equipment, UE, configured as a coordinating user equipment for a user equipment-coordination set, UECS, in a wireless communications network, the method comprising the coordinating user equipment:
- receiving, from each of multiple user equipments in the UECS, a respective UE capability report message;
- consolidating the received UE capability report messages and capabilities of the coordinating user equipment to generate a UECS capability report message;
- transmitting the UECS capability report message to a base station; and
- receiving, from the base station, a HARQ configuration message based on the UECS capability report message.

Example 2: The method of example 1, wherein the UECS capability report message includes an indication of a number of HARQ processes supported by the UECS.

Example 3: The method of example 1 or example 2, wherein the UECS capability report message includes an indication of a number of uplink HARQ processes supported by the UECS, an indication of a number of downlink HARQ processes supported by the UECS, or both.

Example 4: The method of any one of examples 1 to 3, wherein the UECS capability report message includes an indication of a downlink HARQ feedback timing gap for the acknowledgement of jointly received downlink communications, the method further comprising the coordinating user equipment:
- receiving, from the base station, a resource grant for joint-transmission of HARQ feedback for the UECS; and
- scheduling the joint-transmission of the HARQ feedback for the UECS based on receiving the resource grant.

Example 5: The method of any one of examples 1 to 4, the method further comprising the coordinating user equipment:
- receiving I/Q samples from the multiple user equipments for a downlink transmission from the base station; and
- processing the I/Q samples to decode downlink data packets.

Example 6: The method of example 4, the method further comprising the coordinating user equipment:
- receiving the resource grant for joint-transmission of HARQ feedback from the base station in a layer-1 message, a layer-2 message, or a layer-3 message.

Example 7: The method of any one of examples 1 to 6, wherein the UECS capability report message includes an indication of an uplink HARQ feedback timing gap for acknowledgement of jointly transmitted uplink communications, the method further comprising the coordinating user equipment:
- receiving, from the base station, a resource grant for joint-transmission of uplink data;
- jointly transmitting the uplink data using the received resource grant; and
- receiving HARQ feedback for the uplink data at a time after the joint-transmission that is equal to the uplink HARQ feedback timing gap.

Example 8: The method of any one of examples 1 to 7, wherein the UECS capability report message includes an indication of an uplink data timing for joint-transmission of uplink data after a grant for transmission of the uplink data, the method further comprising the coordinating user equipment:
- receiving an uplink grant from the base station; and
- scheduling joint-transmission of the uplink data using the uplink grant and at the uplink data timing after the receiving the uplink grant.

Example 9: The method of example 8, the method further comprising the coordinating user equipment:
- determining that uplink data is pending for transmission to the base station; and
- transmitting a scheduling request to the base station to direct the base station to grant resources for transmission of the uplink data.

Example 10: The method of example 8 or example 9, the method further comprising the coordinating user equipment:
- receiving the uplink grant from the base station in a layer-1 message, a layer-2 message, or a layer-3 message.

Example 11: The method of any one of examples 1 to 10, comprising jointly transmitting the UECS capability report message to the base station via the multiple user equipments of the UECS.

Example 12: The method of example 11, comprising the coordinating user equipment:

encoding the generated UECS capability report message to produce I/Q samples for a joint-transmission of the UECS capability report message to the base station; and forwarding the I/Q samples to the multiple user equipments for directing the multiple user equipments to jointly transmit the encoded UECS capability report message.

Example 13: The method of any one of examples 1 to 12, wherein the receiving the UE capability report messages comprises the coordinating user equipment:

receiving the UE capability report messages using a local wireless network.

Example 14: The method of any one of examples 1 to 13, wherein transmitting the UECS capability report message to the base station, comprises the coordinating user equipment:

transmitting the UECS capability report message to the base station in a Radio Resource Control, RRC, message.

Example 15: The method of any one of examples 1 to 14, wherein the UE capability report message from each of the multiple user equipments comprises an indication of processing resources of the respective UE, an indication of remaining battery capacity of the respective UE, or both, Example 16: The method of any one of examples 1 to 15, wherein the UECS capability report message comprises one of more of: an indication of a number of simultaneous HARQ processes that the UECS can support, an indication of one or more HARQ feedback timing gaps for the UECS, or an indication of an uplink data timing.

Example 17: The method of example 16, wherein the indication of the number of simultaneous HARQ processes includes a number of uplink HARQ processes, a number of downlink HARQ processes, or both.

Example 18: The method of example 16 or example 17, wherein the indication of the one or more HARQ feedback timing gaps includes: a single HARQ feedback timing gap, a HARQ feedback timing gap for downlink communications, a HARQ feedback timing gap for uplink communications, a HARQ feedback timing gap for TDD communications, a HARQ feedback timing gap for FDD communications, or any combination thereof.

Example 19: The method of any one of examples 16 to 18, wherein the indication of the uplink data timing specifies a time between the joint-reception of an uplink grant from the base station and the joint-transmission of uplink data using the uplink grant for the UECS.

Example 20: A user equipment comprising:

a wireless transceiver;

a local wireless network transceiver;

a processor; and instructions for a communication manager application that are executable by the processor to configure the user equipment to perform any one of examples 1 to 19.

Example 21: A method for configuring hybrid automatic repeat request, HARQ, capabilities, by a base station, for a user equipment-coordination set, UECS, in a wireless communications network, the method comprising the base station:

receiving a UECS capability report message;

determining a HARQ configuration for the UECS based on the received UECS capability report message; and transmitting a HARQ configuration message to the UECS, the HARQ configuration message directing a coordinating user equipment, UE, of the UECS to configure the UECS for communication with the base station.

Example 22: The method of example 21, wherein the UECS capability report message includes an indication of a downlink HARQ feedback timing gap for acknowledgement of jointly received downlink communications, the method further comprising the base station:

based on the indication of a downlink HARQ feedback timing gap, determining resources for joint-transmission of HARQ feedback by the UECS; and transmitting a resource grant that includes an indication of the determined resources to the UECS that directs the coordinating UE to schedule joint-transmission of the HARQ feedback for the UECS based on the resource grant.

Example 23: The method of example 22, wherein the transmitting the HARQ configuration message to the UECS further comprises transmitting the resource grant.

Example 24: The method of example 22 or example 23, wherein the base station transmits the resource grant to the UECS in a layer-1 message, a layer-2 message, or a layer-3 message.

Example 25: The method of any one of examples 21 to 24, wherein the UECS capability report message includes an indication of an uplink data timing for joint-transmission of uplink data after a grant for transmission of the uplink data, the method further comprising the base station:

based on the indication of an uplink data timing, determining resources for an uplink grant for the UECS; and transmitting an uplink resource grant that includes an indication of the determined resources for the uplink grant to the UECS that directs the coordinating UE to schedule joint-transmission of uplink data based on the uplink resource grant.

Example 26: The method of any one of examples 21 to 25, wherein the transmitting the HARQ configuration message to the UECS further comprises transmitting the uplink resource grant.

Example 27: The method of any one of examples 21 to 26, wherein the HARQ configuration message includes a number of simultaneous HARQ processes.

Example 28: A base station comprising:

a wireless transceiver;

a processor; and instructions for a base station manager application that are executable by the processor to configure the base station to perform any one of examples 21 to 27.

Although aspects of user equipment-coordination set hybrid automatic repeat request have been described in language specific to features and/or methods, the subject of the appended claims is not necessarily limited to the specific features or methods described. Rather, the specific features and methods are disclosed as example implementations of user equipment-coordination set hybrid automatic repeat request, and other equivalent features and methods are intended to be within the scope of the appended claims. Further, various different aspects are described, and it is to be appreciated that each described aspect can be implemented independently or in connection with one or more other described aspects.

The invention claimed is:

1. A method for reporting hybrid automatic repeat request (HARQ) capabilities by a user equipment (UE) configured as a coordinating user equipment for a user equipment-coordination set (UECS) in a wireless communications network, the method comprising the coordinating user equipment:

receiving, from each of multiple user equipments in the UECS, a respective UE capability report message;

consolidating the received UE capability report messages and capabilities of the coordinating user equipment to generate a UECS capability report message including capability information based on HARQ capabilities of the multiple UEs within the UECS;

encoding the generated UECS capability report message to produce I/Q samples for a joint-transmission of the UECS capability report message to a base station;

forwarding the I/Q samples to the multiple user equipments for directing the multiple user equipments to jointly transmit the encoded UECS capability report message;

jointly transmitting the UECS capability report message to a base station with at least one other user equipment of the UECS; and receiving, from the base station, a HARQ configuration message based on the UECS capability report message.

2. The method of claim 1, wherein the UECS capability report message includes an indication of a downlink HARQ feedback timing gap for the acknowledgement of jointly-received downlink communications, the method further comprising the coordinating user equipment:

receiving, from the base station, a resource grant for joint-transmission of HARQ feedback for the UECS; and scheduling the joint-transmission of the HARQ feedback for the UECS based on the resource grant.

3. The method of claim 2, wherein the UECS capability report message includes an indication of an uplink data timing for the joint-transmission of uplink data after a grant for transmission of the uplink data, the method further comprising the coordinating user equipment:

receiving an uplink grant from the base station; and scheduling joint-transmission of the uplink data using the uplink grant and at the uplink data timing after the receiving the uplink grant.

4. The method of claim 1, wherein the receiving the UE capability report messages comprises the coordinating user equipment:

receiving the UE capability report messages using a local wireless network.

5. The method of claim 1, wherein the UE capability report message from each of the multiple user equipments comprises an indication of processing resources of the respective UE, an indication of remaining battery capacity of the respective UE, or both.

6. The method of claim 1, wherein the UECS capability report message comprises one of more of: an indication of a number of simultaneous HARQ processes that the UECS can support, an indication of one or more HARQ feedback timing gaps for the UECS, or an indication of an uplink data timing.

7. A user equipment comprising:

a wireless transceiver;

a local wireless network transceiver;

a processor; and instructions for a communication manager application that are executable by the processor to configure the user equipment to:

receive, using the local wireless network transceiver and from each of multiple user equipments in a user equipment-coordination set (UECS), a respective user equipment (UE) capability report message;

consolidate the received UE capability report messages and capabilities of the coordinating user equipment to generate a UECS capability report message including capability information based on HARQ capabilities of the multiple UEs within the UECS;

encode the generated UECS capability report message to produce I/Q samples for a joint-transmission of the UECS capability report message to a base station;

forward the I/Q samples to the multiple user equipments for directing the multiple user equipments to jointly transmit the encoded UECS capability report message;

jointly transmit, using the wireless transceiver, the UECS capability report message to a base station with at least one other user equipment of the UECS; and receive, using the wireless transceiver and from the base station, a hybrid automatic repeat request (HARQ) configuration message based on the UECS capability report message.

8. The user equipment of claim 7, wherein the UECS capability report message includes an indication of a downlink HARQ feedback timing gap for the acknowledgement of jointly-received downlink communications, the instructions further executable to configure the user equipment to:

receive, from the base station, a resource grant for joint-transmission of HARQ feedback for the UECS; and schedule the joint-transmission of the HARQ feedback for the UECS based on the resource grant.

9. The user equipment of claim 8, wherein the UECS capability report message includes an indication of an uplink data timing for the joint-transmission of uplink data after a grant for transmission of the uplink data, the instructions further executable to configure the user equipment to:

receive an uplink grant from the base station; and schedule joint-transmission of the uplink data using the uplink grant and at the uplink data timing after the receiving the uplink grant.

10. The user equipment of claim 7, the instructions further executable to configure the user equipment to:

encode the generated UECS capability report message to produce I/Q samples for a joint-transmission of the UECS capability report message to the base station; and forward the I/Q samples to the multiple user equipments for directing the multiple user equipments to jointly transmit the encoded UECS capability report message.

11. The user equipment of claim 7, wherein the instructions to receive the UE capability report messages further configure the user equipment to:

receive the UE capability report messages using a local wireless network.

12. A method for configuring hybrid automatic repeat request (HARQ) capabilities, by a base station, for a user equipment- coordination set (UECS) in a wireless communications network, the method comprising the base station:

receiving, via a joint transmission from multiple user equipments (UEs) within the UECS, a UECS capability report message, the UECS capability report message including capability information based on HARQ capabilities of the multiple UEs (110) within the UECS;

determining a HARQ configuration for the UECS based on the received UECS capability report message; and transmitting a HARQ configuration message to the UECS, the HARQ configuration message directing at least a coordinating user equipment (UE) of the UECS to configure the UECS for communication with the base station.

13. The method of claim 12, wherein the UECS capability report message includes an indication of a downlink HARQ feedback timing gap for the acknowledgement of jointly received downlink communications, the method further comprising the base station:

based on the indication of a downlink HARQ feedback timing gap, determining resources for joint-transmission of HARQ feedback by the UECS; and wherein the transmitting the HARQ configuration message to the UECS further comprises:

transmitting a resource grant that includes an indication of the determined resources to the UECS that directs the coordinating UE to schedule joint-transmission of the HARQ feedback for the UECS based on the resource grant.

14. The method of claim 13, wherein the UECS capability report message includes an indication of an uplink data timing for the joint-transmission of uplink data after a grant for transmission of the uplink data, the method further comprising the base station:

based on the indication of an uplink data timing, determining resources for an uplink grant for the UECS; and wherein the transmitting the HARQ configuration message to the UECS further comprises:

transmitting an uplink resource grant that includes an indication of the determined resources for the uplink grant to the UECS that directs the coordinating UE to schedule joint-transmission of uplink data based on the uplink resource grant.

15. The method of claim 12, wherein the HARQ configuration message includes a number of simultaneous HARQ processes.

16. A base station comprising:

a wireless transceiver;

a processor; and instructions for a base station manager application that are executable by the processor to configure the base station to:

receive, using the wireless transceiver and via a joint transmission from multiple user equipments (UEs) within a user equipment-coordination set (UECS), a UECS capability report message, the UECS capability report message including capability information based on HARQ capabilities of the multiple UEs within the UECS;

determine a HARQ configuration for the UECS based on the received UECS capability report message; and transmit, using the wireless transceiver, a HARQ configuration message to the UECS, the HARQ configuration message directing at least a coordinating user equipment (UE) of the UECS to configure the UECS for communication with the base station.

17. The base station of claim 16, wherein the UECS capability report message includes an indication of a downlink HARQ feedback timing gap for the acknowledgement of jointly received downlink communications, the instructions further executable to configure the base station to:

based on the indication of a downlink HARQ feedback timing gap, determine resources for joint-transmission of HARQ feedback by the UECS; and wherein the instruction to transmit the HARQ configuration message to the UECS configure the base station to:

transmit a resource grant that includes an indication of the determined resources to the UECS that directs the coordinating UE to schedule joint-transmission of the HARQ feedback for the UECS based on the resource grant.

18. The base station of claim 17, wherein the UECS capability report message includes an indication of an uplink data timing for the joint-transmission of uplink data after a grant for transmission of the uplink data, the instructions further executable to configure the base station to:

based on the indication of an uplink data timing, determine resources for an uplink grant for the UECS; and wherein the instruction to transmit the HARQ configuration message to the UECS configure the base station to:

transmit an uplink resource grant that includes an indication of the determined resources for the uplink grant to the UECS that directs the coordinating UE to schedule joint-transmission of uplink data based on the uplink resource grant.

* * * * *